US008676657B2

(12) United States Patent
Fenton

(10) Patent No.: US 8,676,657 B2
(45) Date of Patent: Mar. 18, 2014

(54) AUTOMATED SERVICE AND SUPPORT NOTICES USING ELECTRONIC SHOPPING LISTS

(75) Inventor: Charles Stanley Fenton, Ypsilanti, MI (US)

(73) Assignee: IBM International Group, B.V., Amsterdam (NL)

( * ) Notice: Subject to any disclaimer, the term of this patent is extended or adjusted under 35 U.S.C. 154(b) by 433 days.

(21) Appl. No.: 12/334,237

(22) Filed: Dec. 12, 2008

(65) Prior Publication Data

US 2010/0066498 A1    Mar. 18, 2010

Related U.S. Application Data

(60) Provisional application No. 61/096,625, filed on Sep. 12, 2008.

(51) Int. Cl.
G06Q 30/00        (2012.01)

(52) U.S. Cl.
USPC ........................................................ 705/26.1

(58) Field of Classification Search
USPC ................ 705/26.1, 26.2, 26.25, 26.3, 26.35, 705/26.4, 26.41–26.44, 26.5, 26.61–26.64, 705/26.7, 26.8, 26.81, 26.82, 26.9, 27.1, 705/27.2
See application file for complete search history.

(56) References Cited

U.S. PATENT DOCUMENTS

| 6,317,722 | B1 | 11/2001 | Jacobi et al. |
| 6,587,739 | B1 * | 7/2003 | Abrams et al. ................. 700/83 |
| 6,587,835 | B1 | 7/2003 | Treyz et al. |
| 6,853,982 | B2 | 2/2005 | Smith et al. |
| 6,988,080 | B2 * | 1/2006 | Zack et al. ...................... 705/28 |
| 7,031,933 | B2 * | 4/2006 | Harper ............................. 705/26 |
| 7,355,730 | B2 * | 4/2008 | Landau et al. ............... 358/1.14 |
| 7,756,757 | B1 | 7/2010 | Oakes, III |
| 7,937,067 | B2 * | 5/2011 | Maier et al. ................. 455/404.1 |
| 2001/0032130 | A1 | 10/2001 | Gabos et al. |
| 2002/0035518 | A1 | 3/2002 | Kano |
| 2004/0078272 | A1 | 4/2004 | Brown et al. |
| 2004/0093274 | A1 | 5/2004 | Vanska et al. |
| 2004/0225613 | A1 | 11/2004 | Narayanaswami et al. |
| 2004/0243289 | A1 | 12/2004 | Kelly et al. |
| 2004/0249712 | A1 | 12/2004 | Brown et al. |
| 2005/0192727 | A1 * | 9/2005 | Shostak et al. .................. 701/37 |
| 2005/0232425 | A1 * | 10/2005 | Hughes et al. ................ 380/270 |
| 2005/0261990 | A1 | 11/2005 | Gocht et al. |
| 2006/0143081 | A1 | 6/2006 | Argaiz |

(Continued)

OTHER PUBLICATIONS

Abhaya Asthana et al. "An Indoor Wireless System for Personalized Shopping Assistance", Mobile Computing Systems and Applications, 1994. pp. 69-74, ISBN: 0-8186-6345-6.*

(Continued)

Primary Examiner — Naeem Haq
(74) Attorney, Agent, or Firm — Jackson Walker L.L.P.; Joseph P. Lally

(57) ABSTRACT

A method and system of updating an electronic shopping list (ESL) indicating items that may be purchased in response to detecting, by a wireless device having access to the ESL, a service request event corresponding to an asset. Upon detection of the service request event, a service request item may be inserted into the ESL. The asset may be queried from time to time to verify operation of the asset. The items listed in the ESL may be ordered according to a date the service request event was detected.

15 Claims, 13 Drawing Sheets

(56) References Cited

U.S. PATENT DOCUMENTS

| | | |
|---|---|---|
| 2006/0157564 A1 | 7/2006 | Schulte |
| 2006/0212355 A1 | 9/2006 | Teague et al. |
| 2006/0289637 A1 | 12/2006 | Brice et al. |
| 2007/0066354 A1 | 3/2007 | Silverbrook et al. |
| 2007/0207795 A1 | 9/2007 | Roundtree |
| 2007/0235529 A1 | 10/2007 | Peters |
| 2007/0270129 A1 | 11/2007 | Luo |
| 2007/0281689 A1 | 12/2007 | Altman et al. |
| 2008/0013705 A1 | 1/2008 | Yoffie et al. |
| 2008/0242274 A1 | 10/2008 | Swanburg et al. |
| 2008/0255933 A1 | 10/2008 | Leventhal et al. |
| 2009/0144161 A1 | 6/2009 | Fisher |

OTHER PUBLICATIONS

Causey et al., U.S. Appl. No. 12/038,571, Gift Registry and Comparison Shopper, filed Feb. 27, 2008.

Scanbuy—The Leader in 2D Barcode Solutions. Scanbuy, Inc. May 6, 2009. <http://www.scanbuy.com/web/>.

Scanlife—The Place to Create & Manage 2D Barcodes. Scanbuy, Inc. May 6, 2009. <http://www.scanlife.com/us/>.

Gizmodo—Amazon Japan Cell Phone Fancypants Service. May 6, 2009. <http://gizmodo.com/gadgets/cellphones/amazon-japan-cell-phone-fancypants-service-026198.php>.

Android Scan: pricing and metadata for anything with a barcode. Android Developer Challenge submission by Jeffrey Sharkey. May 6, 2009. <http://scan.jsharkey.org/>.

mShopper. 2B Wireless Inc. May 6, 2009. <http://www.mshopper.net/>.

Khokhar, Sarfraz and Arne Nilsson. Mobility Profiles and Future Location-based Services. Directions Magazine. Aug. 30, 2006. <http://www.directionsmag.com/printer.php?article_id=2268>.

Oh, don't forget . . . May 6, 2009. <http://www.ohdontforget.com>.

SMS Based Schedule Reminder Service: Mobile Marketing Watch—The Pulse of the Mobile Marketing Industry. Mobile Marketing Watch. May 6, 2009. <http://www.mobilemarketingwatch.com/sms-based-schedule-reminder-service/>.

Best Todo list and Task manager—Todoist. Todoist. May 6, 2009. <http://todoist.com/>.

iReminder dosing reminders delivered by phone, email and SMS. iReminder, LLC. Jul. 8, 2009. <http://www.ireminder.com/>.

Office Action, U.S. Appl. No. 12/327,625, mailed Jul. 21, 2011, 29 pages.

Office Action, U.S. Appl. No. 12/334,277, mailed Aug. 4, 2011, 28 pages.

Office Action, U.S. Appl. No. 12/334,277, mailed Dec. 8, 2010, 21 pages.

Office Action, U.S. Appl. No. 12/327,625, mailed Dec. 10, 2010, 18 pages.

Office Action, U.S. Appl. No. 12/341,164, mailed Dec. 30, 2010, 10 pages.

Office Action, U.S. Appl. No. 12/341,078, mailed May 10, 2011, 23 pages.

* cited by examiner

AUTOMATED SERVICE AND SUPPORT NOTICES USING ELECTRONIC SHOPPING LISTS

This application claims priority from provisional application 61/096,625 filed Sep. 12, 2008, which is incorporated herein by this reference as if set forth in its entirety.

BACKGROUND

The present disclosure relates to electronic shopping lists, and more particularly to updating an electronic shopping list.

DESCRIPTION OF THE RELATED ART

Users or shoppers may utilize an electronic shopping list which identifies items the user may purchase. Users may periodically update their electronic shopping lists to reflect changes in the items the user may purchase.

DESCRIPTION OF EXEMPLARY EMBODIMENTS

Figure 1:
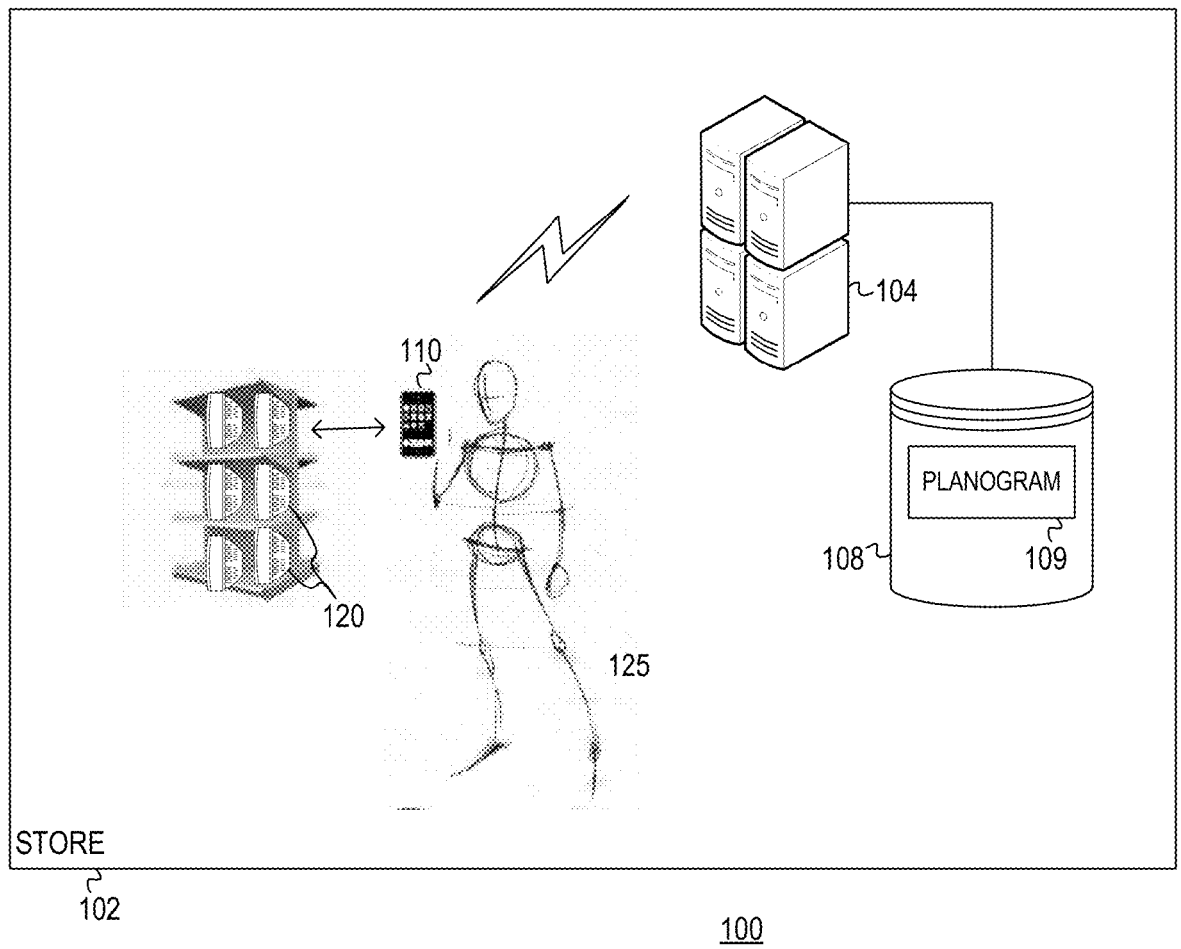
FIG. 1 depicts a mobile device and selected other elements of an embodiment of a system suitable for estimating the current location of a shopper or other type of user within a store such as a retail store.

Consumers and end users have to maintain and service all manner of modern devices/assets. The disclosed service for automating service requests for assets and integrating the service requests into an electronic shopping list (ESL) encompasses periodic replacement of consumables that can be performed by the end user or a service representative for the applicable device or asset. To extend the life and service of applicable equipment, these consumables must be replaced. Keeping track of all of this may be an ongoing inconvenience for an end user.

The disclosed subject matter informs, by periodic electronic notices or interrogation and push notices, the mobile device of the user of the need for service for various personal/business devices or assets. A shopping assistant residing on the mobile device may schedule applicable service or include applicable replacement parts on an ESL. The mobile device may query the applicable asset or a proxy connected to the asset to determine whether service is required or to verify that the connection with the applicable asset is working normally. The ESL may be shared with applicable retailers who may in turn provide the end user with an incentive to visit the retailer to purchase one or more of the items listed on the ESL.

In a first aspect, disclosed embodiments encompass systems and methods for incorporating service requests for devices in the home and office into an ESL. A system may include a mobile device configured with a shopping assistant and an ESL. The mobile device may have local wireless capability, e.g., Bluetooth and/or WiFi capability, and would use the same to establish a service support relationship with devices or assets that require periodic maintenance or supplies. Such devices or assets may include computers, printers, water filters, air conditioning filters, automobiles, and the like. Depending on its communication capabilities, an asset may notify the mobile device shopping assistant when the asset may need service; for example, a printer may need a new color cartridge. The shopping assistant would then convert these notifications into service requests and include the service requests in the mobile device's ESL.

In cases where an asset lacks communication facilities (a "dumb" asset), yet still requires periodic servicing, a dumb asset proxy may generate periodic service notices that the shopping assistant can respond to. The dumb asset proxy may have access to a list of commonly encountered dumb assets, for example, air conditioning filters. Users may select which dumb assets they wish to receive periodic service notices for and the proxy would generate the requested requests for the applicable dumb assets at selected intervals. The dumb asset proxy may reside on the mobile device or elsewhere. Alternatively, a signaling device or other type of communication facility could be attached to a dumb asset. The signaling device may include a sensor that enables the signaling device to monitor a parameter of the asset, e.g., air flow through an air conditioning filter, and signal the shopping application when the monitored parameter fails to comply with a specified criteria.

Some assets may have communication facilities and interfaces, but those communication facilities and interfaces may not comply with communication protocols supported by the mobile device. For example, motor vehicles may have onboard diagnostic (OBD) facilities and an OBD-II interface that provide a wealth of diagnostic information in a standardized format, but not in a format that the mobile device would generally support. In cases such as these, a proxy in the form of a blue tooth adapter could be added to the asset's communication interface, e.g., the OBD-II interface on a motor vehicle to provide notice when both routine service intervals and other extraordinary events occur.

In a second aspect, disclosed methods, systems, devices, and software enable locating a user or shopper with respect to items in a store, and thereby, locating the position of the user in the store. In one embodiment, the disclosed subject matter identifies the general location of the user in a store by exposing a store planogram (i.e., a database or data structure that includes information from which locations, maps, or diagrams of items, fixtures, and/or facilities within the store can be generated) to a mobile or wireless device of the user. The planogram contains data that indicates the location of the store items and this information may be used to identify the location of the user within the store. The mobile device may be a network aware device capable of wirelessly communicating via an IP or other type of packet-switched network. The mobile device may further include cellular telephony functionality. The mobile device may have processing capacity, display resources, and keypad support sufficient to execute applications such as Web browsers and other applications. In embodiments suitable for use in retail shopping applications, the mobile device may further include a camera or other type of image capture device and the user may cause the mobile device to interact with a store item by scanning or entering bar codes, UPC codes, pictures, etc. of the store item. The user may convey information pertaining to a store item by removing or checking off the store item from an ESL saved in a memory or other type of storage media of the mobile device. The disclosed subject matter permits a determination of the user's location within the store and facilitates opportunities for providing targeted promotion and services to the user based on the user's location. Currently, users generally locate themselves within a store via applicable signage or by requesting help from store employees. In addition to signage, stores often use high cost systems such as cameras and clerks to locate or assist users with questions pertaining to location or to otherwise provide additional promotions or services to users.

In one embodiment, the disclosed subject matter resolves user location within a store by making the store's planogram or schematic accessible to the user's mobile or wireless device. In one embodiment, an application, referred to herein as a shopping assistant, is provided for use with the user's mobile phone. The shopping assistant is operable to provide and maintain an ESL and may include hardware and/or software facilities to recognize store items by bar code, UPC code, pictures, and the like. When a shopping event, such as the mobile device interacting with a store item using the phone or the user moving an item from the ESL to a shopping cart, the shopping assistant may identify the location of the user from the store item involved in the shopping event and the item placement information within the store's planogram or schematic. As the user moves through the store and selects items, a location trail for the user may be developed. This location trail, or item selection trail, identifies the approximate location of the user. A more specific location may be established by having the user scan/enter multiple different items in proximity to the user. This procedure may establish the location of the user within a few feet. Users can request their location and, if the location is known because of recent actions in the selection trail, then a response can be provided. If the age of the selection trail exceeds a specified threshold, a request could be transmitted to the mobile device for display. The request could prompt the user to use the mobile device to scan, enter, or otherwise interact with some nearby store items in order to refine the location.

The disclosed subject matter provides the store and user with an estimate of the user's physical location with the store. The estimate may be a sufficiently accurate location for a variety of purposes, e.g., promoting items that are known to be close to the user's current location and guiding the user to items that are on the user's ESL. The estimate of the user's location derived in this manner is generally preferable to estimating the user's position using GPS systems, which are frequently unreliable or non-operational in stores because of metal roofs and structures that attenuate the signals necessary for precise location using GPS systems. In one embodiment, the user may be permitted to opt-in or to opt-out of the location estimation system. The disclosed subject matter benefits the store by providing a mechanism for location specific promotion and service to the user. Through one embodiment, the store would know where a user is in the store, and consequently, the store may better serve the specific needs and wants of the user while at the same time having minimal or no infrastructure costs associated with implementation of the disclosed subject matter (commonly referred to as chain math).

In a third aspect, subject matter describing retail promotion and inventory management based on anticipated customer or end user behavior is disclosed. The anticipated behavior is derived from electronic shopping lists (ESLs) provided by the end user from a web screen and/or mobile phone. The ESL may be voluntarily provided by the end user in exchange for consumer preference promotions based on the listed related items. The inventory management is derived from the provided list as a projection of future inventory requirements for the store.

Because current retail promotion and inventory management is predicated on past behaviors, i.e., what has been purchased by the customer as opposed to what is planned to be purchased by the customer, current inventory planning is generally a best guess based on tracked behaviors of population groups. Additionally, there is little, if any personalization to the current methods of advertising via circulars, or broadcast advertisements. The closest method may be direct mail to an individual, but this is a costly technique.

The disclosed subject matter includes a shopping assistant/agent which is computer and mobile phone based and which has access to a retail organization portal. An end user or customer may prepare an ESL on both the computer and mobile phone which are kept synchronized. End users may selectively grant retail organizations access to their ESLs. End users may grant ESL access to retail organizations either anonymously or "personally," i.e., in such a way that the retail organization is aware of the user's identity. Retail organizations gain access to the ESL through the portal, in exchange for promotion information, coupons, store stock item detail, loyalty program features, additional services, discounts, and the like. Access to the end user's ESL provides a forward look into retail demand based on the specific intention of the end users who provide their ESLs. The lists allow retailers to more accurately anticipate demand, and consequently, plan inventory and promotions based on intended purchases rather than based on conventional statistical methods that rely entirely or substantially entirely on historical purchase data. Additional accuracy may be achieved by monitoring items identified on ESLs against items actually purchased. While an item may be on the ESL, it is an indication of intent to purchase, rather than a guarantee that the item will be purchased. Purchase history (like present techniques) can be compared with intentional list items providing a way to gauge the likelihood of purchase, thereby improving the list based forecast for inventory and promotions. The disclosed subject matter improves upon strict historical/statistical inventory and promotion techniques through access to ESLs, which are indicative of a specific intent to purchase the listed items. When these anticipatory ESLs are combined with actual purchase data, an intention gauge (actual purchase divided by intended purchase) is created that may further refine the forward looking requirements, e.g., by placing greater weight on anticipatory ESLs from users with a high intention gauge.

The result is that the disclosed subject matter may benefit retailers by providing them an accurate picture of consumer demand based upon specific intention. Consequently, the retailers can more reasonably plan inventory, thereby reducing capital tied up in excess inventory and provide sufficient stock-on-hand to meet consumer demand. Additionally, the retailers may better plan promotions to customers that have a specific intention to purchase items related to the promotions. The customers benefit by having access to products based on their intention-list (with items being available when and where they want/need them) and the retailers and customers both benefit by retailer promotions that are targeted to the appropriate consumer at reduced costs.

In a fourth aspect, the disclosed subject matter encompasses the application of a store planogram to an ESL on a mobile device to provide guidance to item location in the applicable store. The disclosed subject matter provides the end user with a detailed plan for a recommended sequence of locating the items within the store. The detailed plan may be provided as text (e.g., by aisle and area) or as pictures illustrating the item and location in the aisle and area.

To efficiently shop in a retail store, an end user or shopper must either know where items are located via past experience, or figure out the layout of the store, or request help. This may be complicated by having numerous items to purchase, and thereby, compounding the time to locate the items. Stores generally provide maps, aisle descriptions, signage, and clerks to assist in identifying item location. When shoppers can't find an item, they frequently give up and leave the store. The disclosed subject matter compares the store's planogram or other type of data structure that includes item location information, to an end user's ESL on a mobile device. The disclosed method may re-order the ESL based on the store location of the ESL items as indicated in the planogram location, e.g., aisle by aisle, and area by area, so as to facilitate the end user's efficient movement through the store to acquire the applicable items. Additionally, a store map of aisle and area location could be provided to the mobile device as an overall guide to the layout of the store.

The disclosed subject matter improves the shopping experience of the shopper. It provides them the item location information in an ordered fashion and removes the need for the shopper or end user to look to maps, kiosks, signage, or store clerks for assistance in locating items and can be particularly important during seasonal changeovers or other reorganization of store layouts.

In a fifth aspect, disclosed subject matter relates to providing incentives for social network members to opt into a promotional program associated with a retailer or other seller of goods or services. The disclosed subject matter provides for the tracking of social network members who participate in the promotional program. The retailer may be or include a brick and mortar store and an incentive to visit the brick and mortar store may be provided. Such incentives may include offering enhanced differential coupon value for a store visit over an online, web-based purchase.

In one embodiment, retailers tender store and product coupons to participant customers or end users that voluntarily opt in (subscribe) to receive the coupons. The end users may then refer their social network contacts to the incentive program by encouraging them to submit their web and phone addresses (email, IM, SMS, or the like etc.) to the retailers. This process may continue as long as the coupon tender is active. The coupon tender period may be limited so as to create scarcity and consequent value. The limit could be time, product quantity, number of participants or any other factor or changing factor determined to generate interest.

The social network referrals would be captured by the disclosed subject matter and used to identify primary lead generators, as well as market preference data for future demand generation. In one embodiment, interest would be promoted by increasing coupon value for lead-referral. The more participants, the more discount for the leaders and/or participants. Alternatively, additional coupon promotions and advertising may be offered during the tender period. Demand shaping for web and brick and mortar stores would be managed by differential coupon value for one or the other depending on where the coupon is exercised. For example, if there was a desire to drive demand to the brick and mortar store, then the coupon would have greater value at the store. The system also supports 'herd purchase' where an end user may gather a group (the herd) together and solicits a discount coupon from a participating retailer based on the size of the herd. The retailer may offer this facility to participants at any time on a range of goods; overstock or end of season.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

FIG. 1 depicts a mobile device 110 and other selected elements of an embodiment of a system 100 suitable for providing assistance to a shopper or other type of mobile device user 125 within a store 102. The embodied system 100 includes a store server 104 suitable for detecting either an interaction between mobile device 110 and a store item 120 or another type of event associated with mobile device 110 and store item 120. Store server 104 may respond to detecting the interaction or other type of event, by accessing a store planogram or other type of database 108, which may be remotely located or resident on server 104. The depicted database 108 includes a data structure, identified as planogram 109, indicative of a position of store item 120 within store 102. Store server 104 may retrieve position data applicable to store item 120 from planogram 109 and estimate a position of user 125 within store 102 based on the retrieved data. Store server 104 may then use the estimate of the user's position to provide user 125 with information that is based, at least in part, on the estimated position. In various embodiments, the event associated with mobile device 110 and shopping item 120 may be communicated to store server 104 by a message from mobile device 110.

Figure 2:
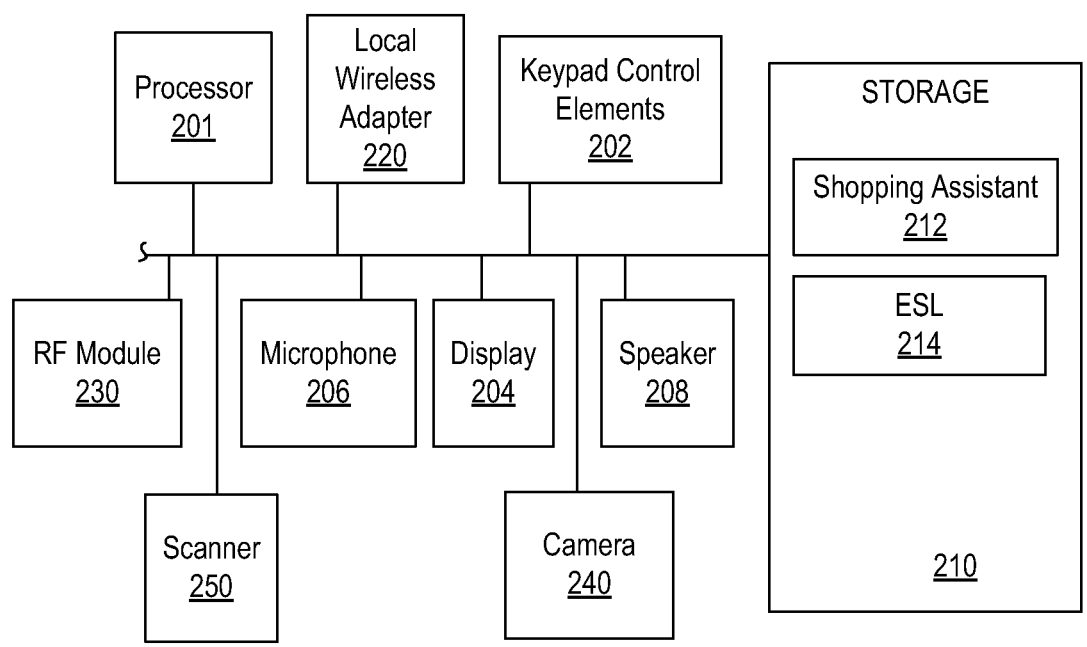
FIG. 2 is a block diagram of selected hardware and software elements, including a shopping assistant module, of an embodiment of a mobile device depicted in FIG. 1.

Referring to FIG. 2, selected elements of an embodiment of mobile device 110 are depicted. In the depicted embodiment, mobile device 110 includes a processor 201 having access to tangible computer readable storage media, collectively represented in FIG. 2 as storage 210. Storage 210 may contain or include one or more software applications including an application identified as shopping assistant 212. Storage 210 may further include one or more data structures including a data structure identified as ESL 214. Mobile device 110 as shown in FIG. 2 further includes peripheral elements that are accessible to processor 201 including a scanner 250, a display 204, and keypad control elements 202, which may implemented as hardware buttons, soft keys, or the like. Mobile device 110 as shown further includes a microphone 206, a radio frequency (RF) module 230 suitable for establishing cellular communication, a camera 240, a speaker 208, and a wireless adapter 220 suitable for supporting communication with a wireless data network, e.g., a Bluetooth or WiFi network, that may be confined within store 102 and locations in close proximity to store 102. Mobile device 110 as depicted in FIG. 2 may be characterized by its ability to support cellular communication including voice communication and text message communication as well as wireless data communication including Web communication, email communication, instant messaging communication, and the like. Mobile device 110 may include selected elements of commercially distributed smart phones including, as an example, an iPhone® brand phone from Apple, configured with the aforementioned devices.

Mobile device 110 may be utilized to participate in one or more of the following events: (i) scanning a code of a store item using scanner 250, (ii) taking a picture or otherwise capture an image of a store item using camera 240, (iii) detecting a radio frequency identification (RFID) of a store item using RF module 230, or (iv) performing a user initiated modification of an ESL stored in storage 210 of mobile device 110 and maintained by shopping assistant 212. The event may then be transmitted by mobile device 110 using wireless adapter 220 to server 104. Information (including store location, promotional materials, store maps, directions, or requesting additional information from the user in order to assist with determining the user's location) may be provided to user 125 via display 204 or speaker 208 of mobile device 110.

Figure 3:
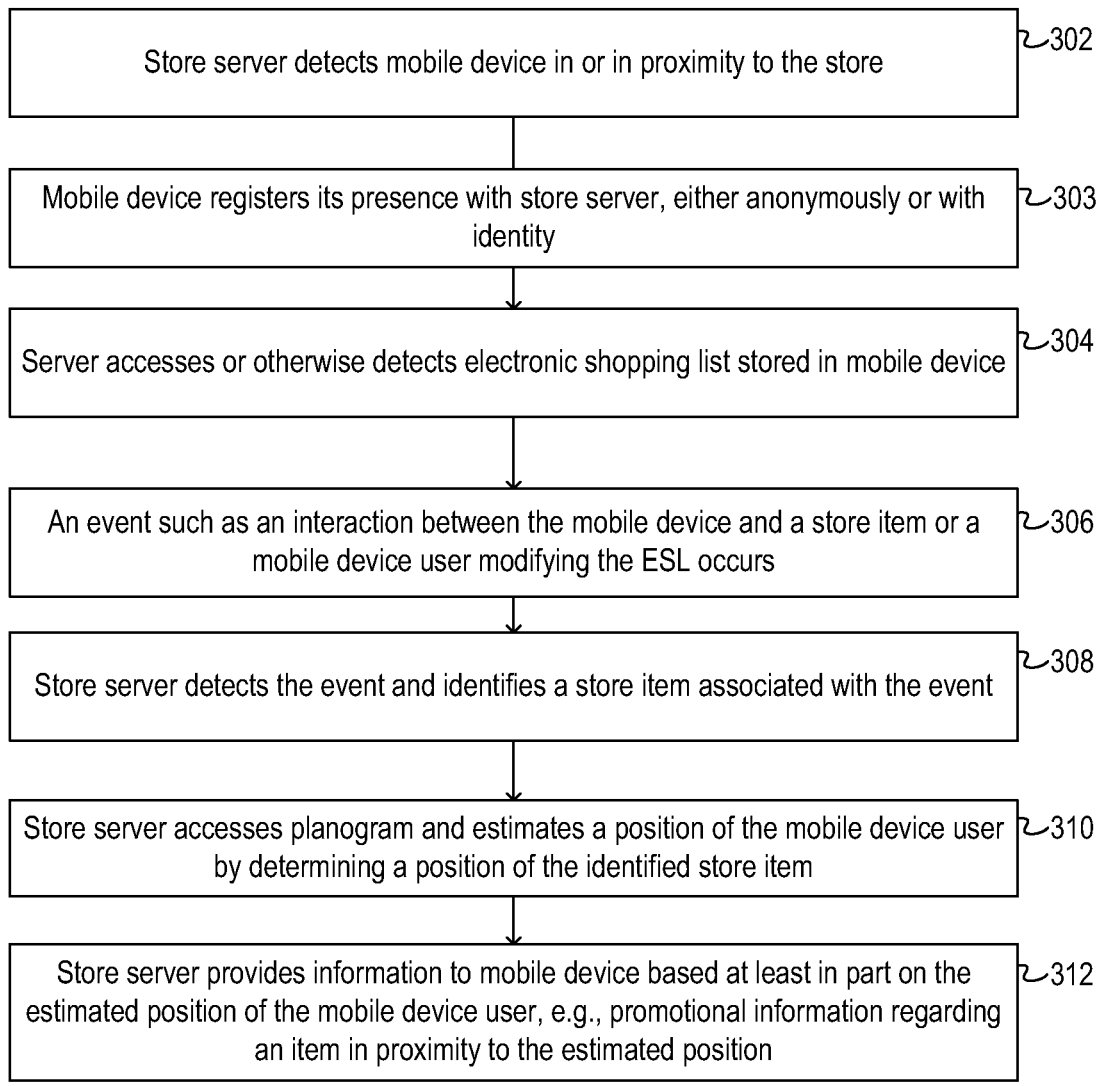
FIG. 3 is flow diagram of selected elements of an embodiment of an electronic shopping assistance method.

In some embodiments, disclosed embodiments may be implemented as methods of use and or computer software, both of which may be represented as flow diagrams where, in the case of computer software, the flow diagram blocks correspond to instructions embedded in a computer readable medium such as storage 210 of mobile device 110 or storage associated with store server 104. As depicted in FIG. 3, a disclosed method 300 includes detecting (block 302) mobile device 110 upon entering store 102 and registering mobile device 110, anonymously or non-anonymously (block 303). Server 104 may extract or otherwise access (block 304) an ESL from mobile device 110 and provide promotional materials, e.g., coupons, or other assistance to user 125 by way of mobile device 110. When an interaction or another type of event associated with mobile device 110 and store item 120 occurs (block 306), the event may be detected (Step 308) by server 104. Server 104 accesses or otherwise consults (block 310) planogram 109 to approximate the location of user 125 based on the information provided as result of the detected event. Server 104 may then provide (block 312) data or other information to user 125 via mobile device 110 based on the estimated location of user 125. In some instances, store item 120 may be a stock item of the store available for sale or use by consumer/users and in other instances store item 120 may be a wireless transceiver affixed to a known position within store 102.

Figure 4:
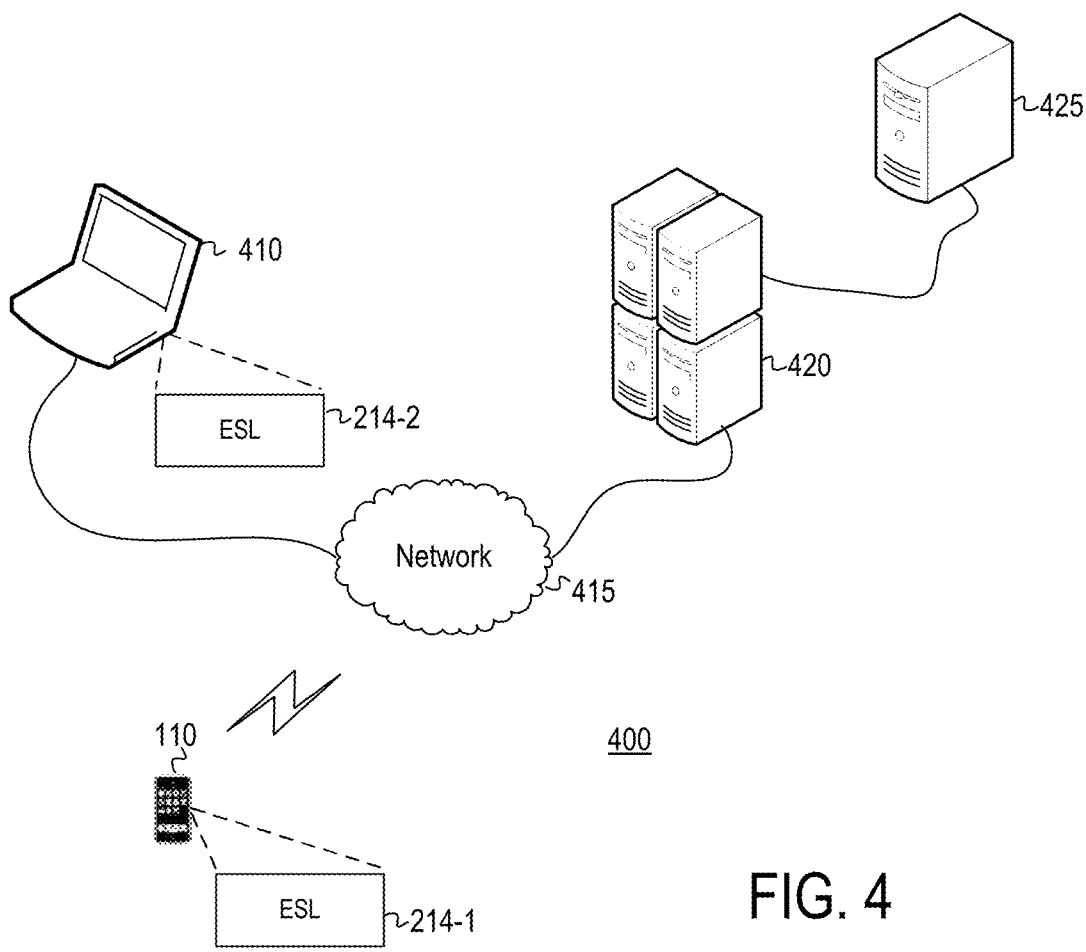
FIG. 4 depicts a mobile device and selected other elements of an embodiment of a system suitable for facilitating inventory management.
Figure 5:
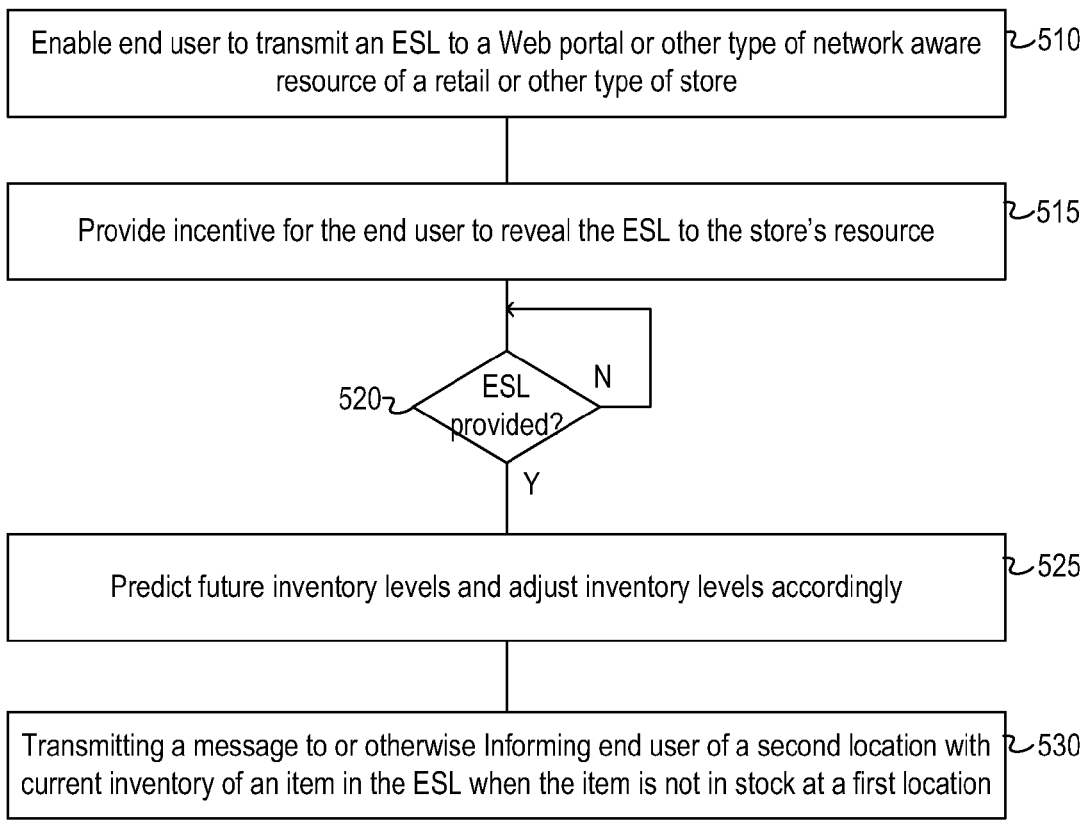
FIG. 5 is flow diagram of selected elements of an embodiment of an inventory management method performed by the system of FIG. 4.

Referring now to FIG. 4 and FIG. 5, selected elements of embodiments of a system 400 and method 500 of leveraging ESLs to manage inventory are disclosed. In an embodiment depicted in FIG. 5, method 500 includes enabling (block 510) an end user to provide an ESL 214 to a network resource 420.

In some embodiments, the items contained in ESL 214 represent items that may be purchased in the future by the end user. The end user may maintain an ESL 214-1 on mobile device 110 and may separately, or in addition to, maintain an ESL 214-2 on computer 410, which may represent a home computer of the end user. If maintained on both mobile device 110 and computer 410, ESLs 214-1 and 214-2 may be automatically synchronized so that any revisions made to ESL 214-1 will be automatically reflected in ESL 214-2 and vice versa. Alternatively, the end user may download an application from network resource 420 or from another available resource which application is suitable for creating ESL 214. The end user may provide ESL 214 to network resource 420 via network 415 by mobile device 110 and/or computer 410. In addition, ESL 214 may be generated via an online interface to network resource 420.

In the depicted embodiment, the end user may be incentivized (or induced or motivated) (block 515) to provide ESL 214 to network resource 420. Such incentivizing may include notifying the end user of sale events concerning items on the ESL or providing a coupon to the end user. In some embodiments, the coupon may be for at least one item on ESL 214. In another embodiment, a store 102 or other retailer may be associated with network resource 420 and in such embodiment, network resource 420 may be implemented as a Web server portal of store 102 or such other retailer. Responsive to the end user providing ESL 214 to network resource 420 as determined in block 520, ESL 214 is used by inventory management application 425 to predict and adjust (block 525) future inventory needs.

Inventory management application 425 may be utilized to maintain information tracking items on ESL 214 versus items purchased by the end user so that when ESL 214 is used to predict future inventory needs, such predictions include predicting future levels of inventory based, at least in part, on the tracking information. In some embodiments, the tracking information may be obtained during predetermined intervals. In yet additional embodiments, the tracking information may be utilized to determine a likelihood of purchase factor for the end user. In the depicted subject matter, responsive to an item listed on the ESL not being in stock at the store, information indicative of another store location where the item is in stock may be transmitted (block 530) to the end user.

Figure 6:
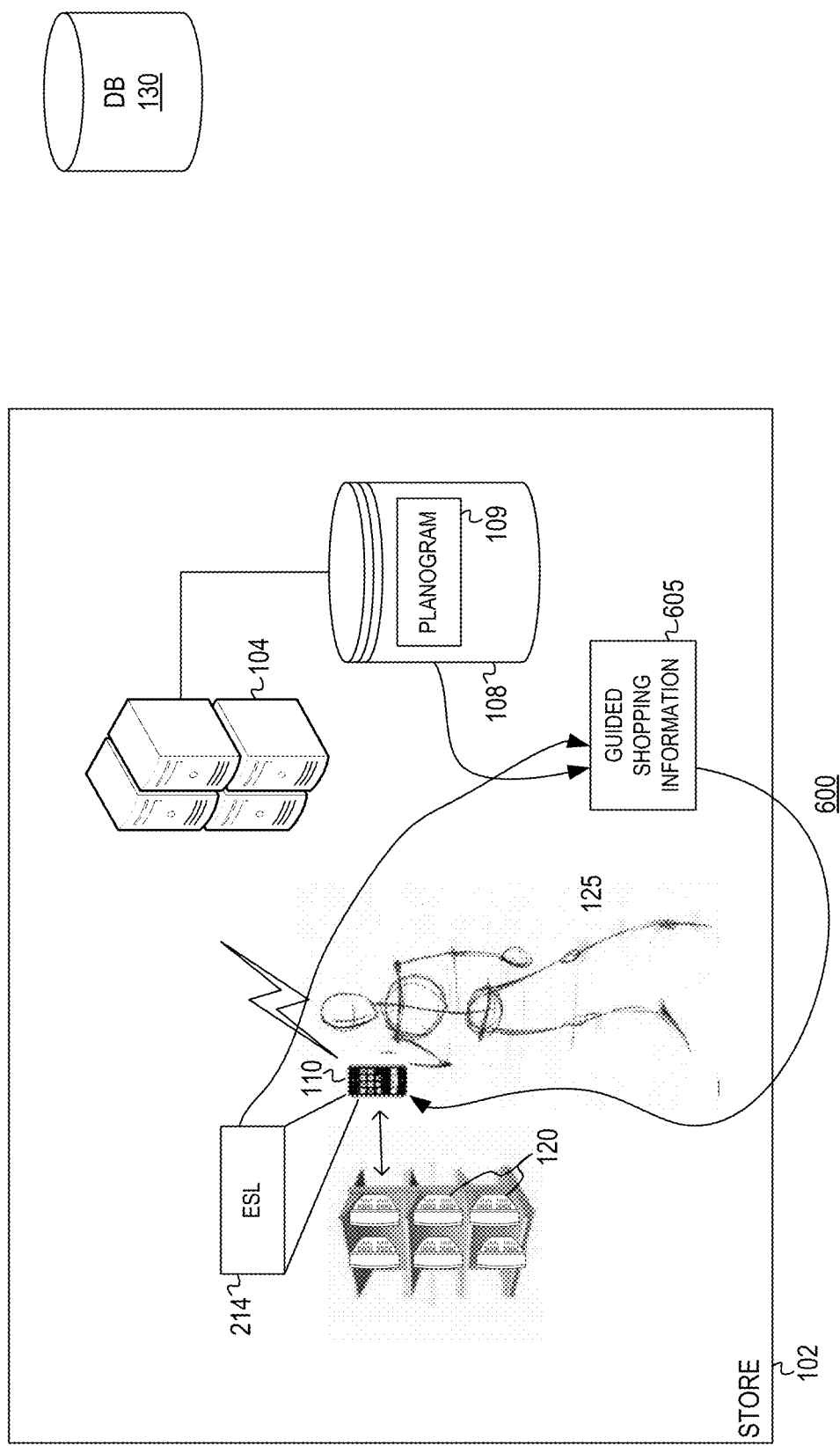
FIG. 6 depicts a mobile device and selected other elements of an embodiment of a system suitable for providing electronic shopping list (ESL) specific item location assistance within a store.
Figure 7:
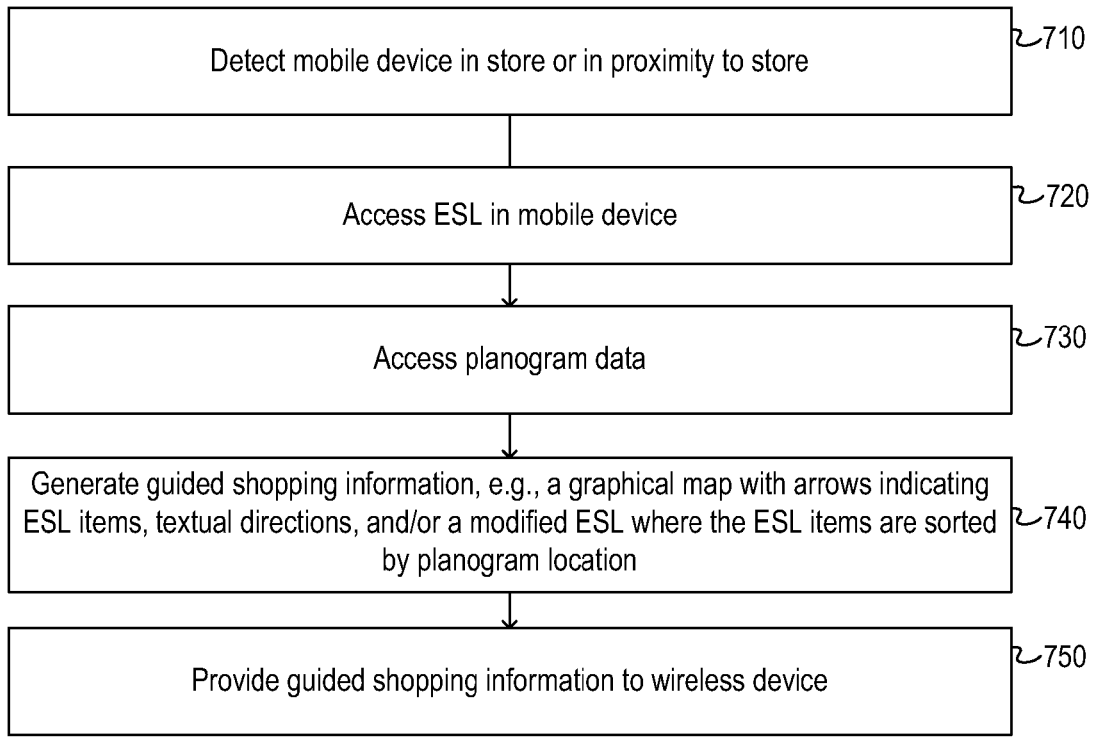
FIG. 7 is a flow diagram of selected elements of an embodiment of an electronic shopping assistance method.
Figure 8:
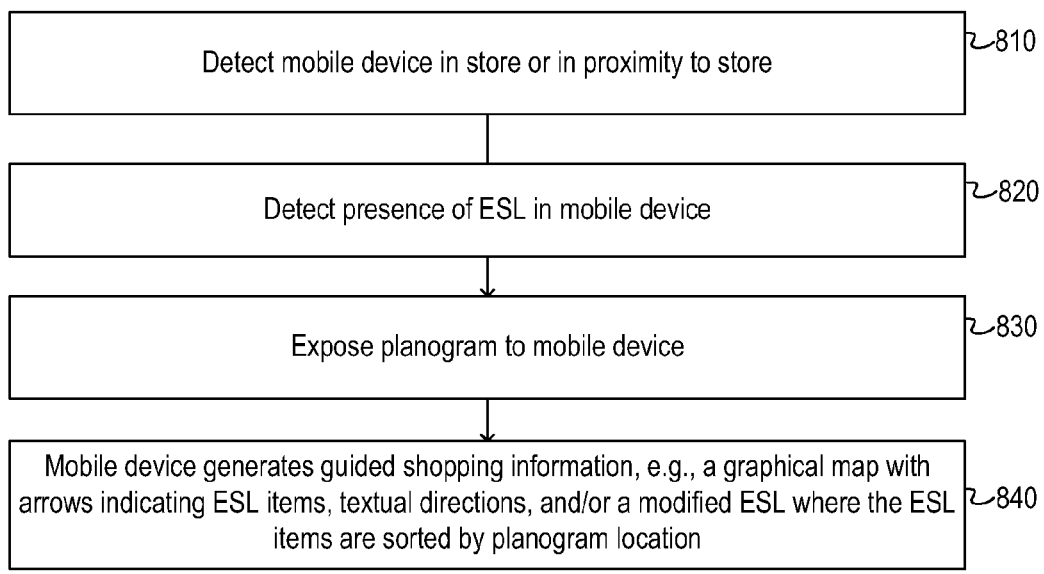
FIG. 8 is a flow diagram of selected elements of an embodiment of an additional electronic shopping assistance method.
Figure 9:
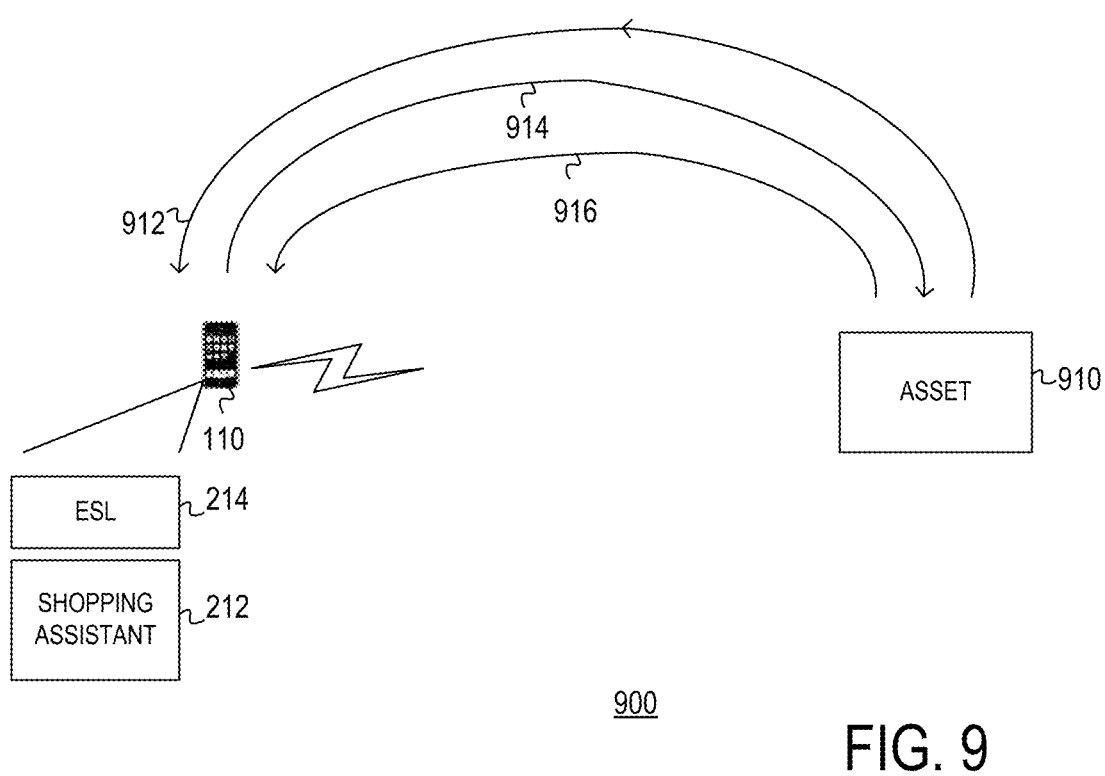
FIG. 9 depicts a mobile device and selected other elements of an embodiment of a system suitable for generating service requests for assets in the home and office.

Referring now to FIGS. 6, 7, and 8, an embodiment of a system 600 and method 700 for providing assistance to an end user or shopper 125 to locate items within store 102. In the depicted embodiment, system 600 illustrates ESL 214 resident on mobile device 110. In the disclosed embodiment of method 700, when mobile device 110 is detected (block 710) as being in proximity to store 102, server 104 accesses (block 720) ESL 214 in mobile device 110 and accesses (block 730) store database 108, which may include planogram 109 to generate (block 740) guided shopping information 605 and provide (block 750) to mobile device 110 for use by end user 125.

In an alternative embodiment, upon detecting (block 820) the presence of electronic shopping guide 214 in mobile device 110, server 104 may expose (block 830) database 108, which may include planogram 109, directly to shopping assistant 212 resident on mobile device 110 to provide (block 840) guided shopping information 605.

Guided shopping information 605 may include an image of a layout of store 102, the location of the mobile device in store 102, text based directions for navigating store 102 to locate the items, and/or the ESL sorted based on the location of the items in store 102. In another embodiment, guided shopping information 605 may also include providing promotional content to mobile device 110 wherein the promotional content is determined in part by at least one of the items in ESL 214 and may include promotional content directed at an item located in proximity to an item in ESL 214.

Turning now to FIG. 9, FIG. 10, FIG. 11, and FIG. 12, embodiments of systems and methods for updating a ESL and for the automated generation of ESL items pertaining to periodic service or maintenance tasks needed for home and office appliances and other assets is presented. The embodiments represented by FIG. 9 and FIG. 12 employ a mobile device 110 with an ESL 214 resident thereon configured to perform ESL update method 1200. Mobile device 110 detects (block 1205) a service request event 912 corresponding to an asset 910. In response to detecting service request event 912 from asset 910, shopping assistant 212 inserts, includes, or otherwise modifies (block 1210) ESL 214 to include an item needed to take action on the service request. The ESL may be ordered according to the date the service request event 912 was detected. In one embodiment, the service request event may include a service request message 912 wirelessly transmitted by asset 910. In another embodiment, mobile device 110 may send a query 914 to asset 910 from time to time to verify asset operation or to determine if a service event request has occurred. The service request event may also include a response 916 to a service request inquiry generated by mobile device 110.

Figure 10:
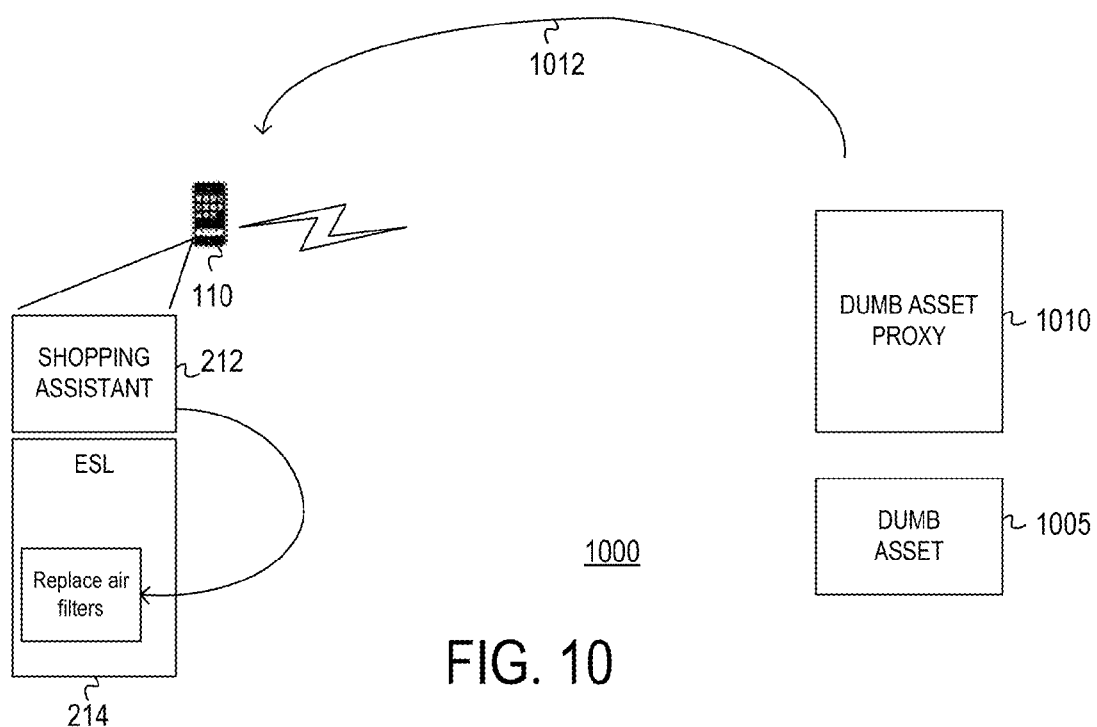
FIG. 10 depicts a mobile device and selected other elements of an embodiment of a system suitable for generating service requests for dumb assets in the home and office.
Figure 11:
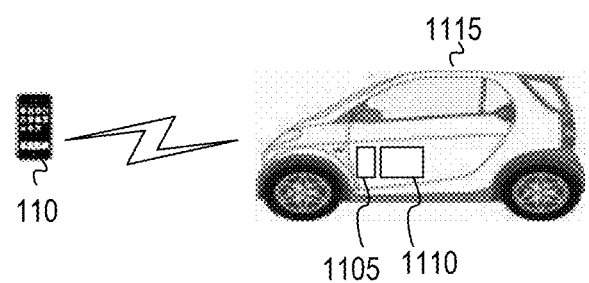
FIG. 11 depicts a mobile device and selected other elements of an embodiment of a system suitable for generating service requests for assets having non-compliant communication protocols.
Figure 12:
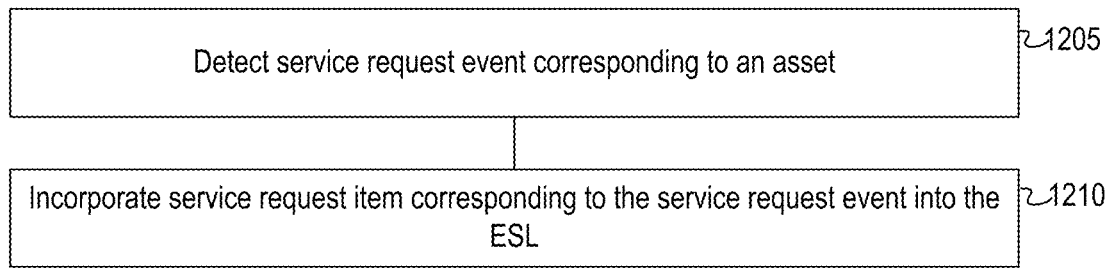
FIG. 12 is a flow diagram of selected elements of an embodiment of a method for generating service notifications for use by a mobile device shopping assistant and inclusion in a mobile device ESL.

In some embodiments, emphasized in FIG. 10, the asset may include a dumb asset 1005 such that the service request event includes a service request event 1012 generated periodically by a proxy 1010 for dumb asset 1005. Proxy 1010 may reside on mobile device 110, may reside on a computer (not shown), or may reside on, or proximate to, dumb asset 1005. In embodiments emphasized in FIG. 11, Asset 910 may be an automobile 1115 and may include a limited protocol interface 1110, an interface that is non-compliant with protocols supported by mobile device 110. In this case, a service request for the asset may be generated by a compliant protocol adapter 1105 connected to limited protocol interface 1110. In one embodiment limited protocol interface 1110 may include an on board diagnostic (OBD) interface (such as OBD-II interface for an automobile). In some embodiments, adapter 1105 may be a Bluetooth adapter, a WiFi adapter, or another type of local wireless adapter.

Figure 13:
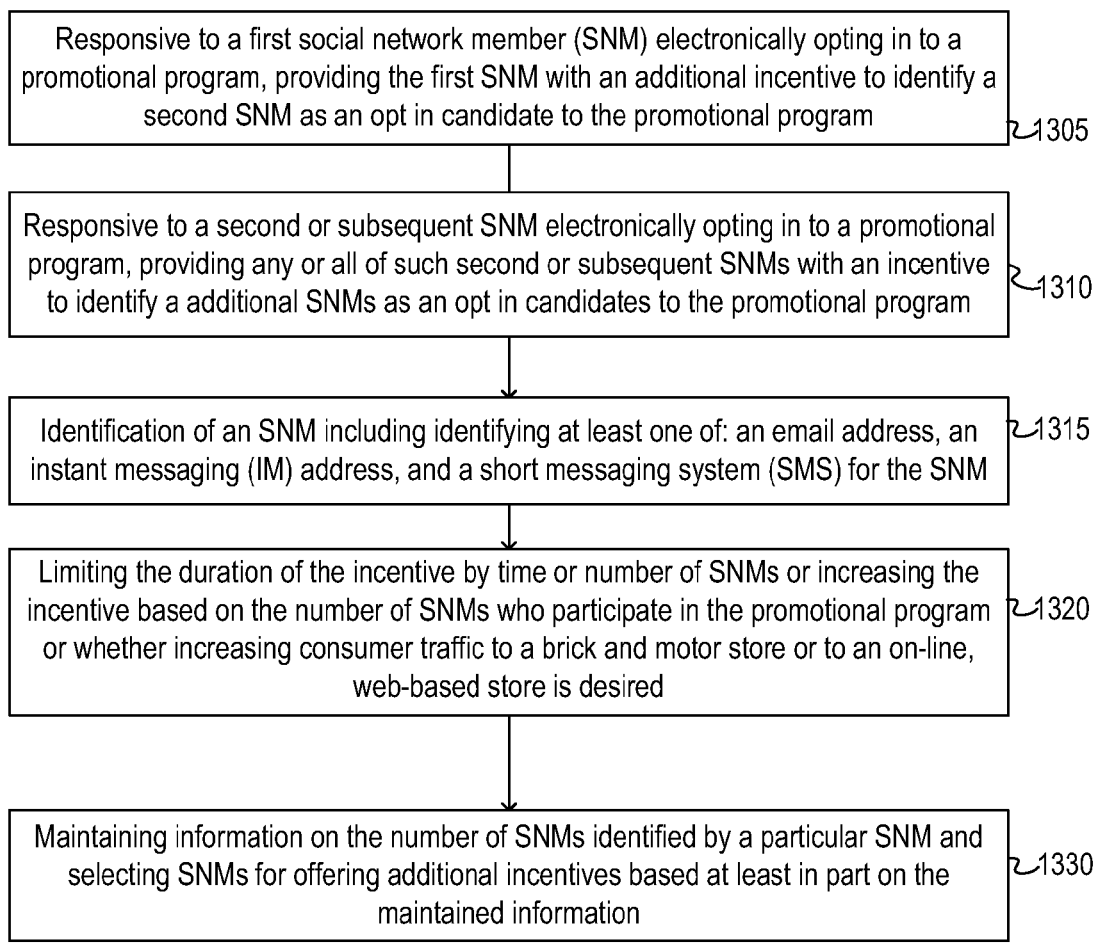
FIG. 13 is a flow diagram of selected elements of an embodiment of a method for leveraging social networks for retailing.

Turning now to FIG. 13, selected elements of a marketing method for providing an incentive for social network members to opt into a promotional program associated with a seller of goods or services are disclosed. Responsive to a first social network member (SNM) electronically opting in to a promotional program, the first SNM is provided with an additional incentive to identify (block 1305) a second SNM as an opt in candidate to the promotional program. Each SNM may be provided (block 1310) with an incentive to identify one or more additional SNMs as an opt in candidate to the promotional program. In the depicted embodiment, identifying an opt in candidate may include identifying (block 1315) an email address, an instant messaging (IM) address, or a short messaging system (SMS) of the candidate.

In addition to the initial incentive to the first SNM, each SNM who participates may be provided with an incentive. In the depicted embodiment, providing incentives may include providing (block 1320) a store coupon or a product coupon and may include additional advertising regarding the promotional program or other programs. In one embodiment, the value of the incentives may increase depending on the quantity of SNMs who participate in the promotional program. In some embodiments, the incentives and/or the value of the incentives may be limited to a predetermined period of time, a predetermined number of SNMs, a predetermined level of participation, or may be based on whether the seller or retailer desires to direct traffic to a brick and mortar store or to an online, web-based store. (Block 1320) This information may be maintained and used to identify previous SNMs for inclusion in future promotional programs (Block 1330).

Figure 14:
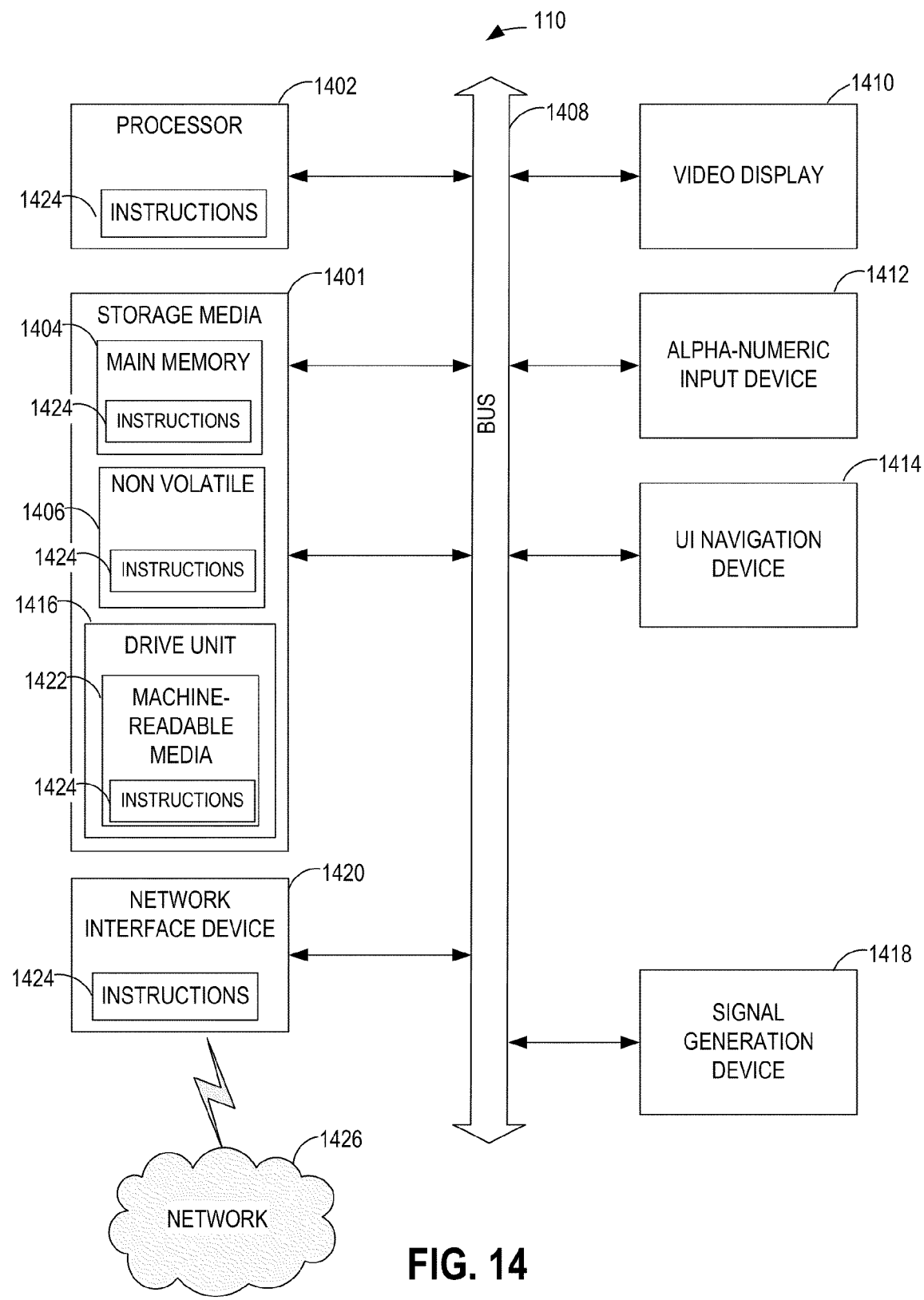
FIG. 14 illustrates a data processing elements of a device suitable for use with disclosed embodiments of automated service and support notice generation methods for electronic shopping lists.

As shown in FIG. 14, mobile device 110 is configured to include a processor 1402, e.g., a central processing unit, a graphics processing unit, or both, and storage media 1401 that includes a main memory 1404 and a non-volatile memory 1406. Mobile device 110 may include an optional disk drive unit 1416. Optional disk drive unit 1416 and other components of storage media 1401 communicate with processor 1402 via bus 1408. Optional disk drive unit 1416 may include a solid state machine-readable medium 1422 that may have stored thereon one or more sets of instructions 1424 and data structures (not depicted) embodying or utilized by any one or more of the methodologies (including method 1200) or functions described herein. The instructions 1424 may also reside, completely or at least partially, within the main memory 1404, within non-volatile memory 1406, within network interface device 1420, and/or within the processor 1402 during execution thereof by system 400. Mobile device 110 may further include a video display unit 1410 (e.g., a liquid crystal display) on which to display information processed by mobile device 110). Mobile device 110 also includes alphanumeric input device 1412 (e.g., a keyboard), an optional user interface (UI) navigation device 1414 (e.g., a trackball or a mouse), signal generation device 1418 (e.g., a speaker) and network interface device 1420. Input device 1412 and/or UI navigation device 1414 (e.g., a remote control device) may include processors (not shown), and further memory (not shown).

Instructions 1424 may be transmitted or received over a network 1426 via network interface device 1420 using any one of a number of transfer protocols (e.g., broadcast transmissions, HTTP). While the machine-readable medium 1422 is depicted as a single medium, the term "machine-readable medium" should be construed as including a single medium or multiple media (e.g., a centralized or distributed database, and/or associated caches and servers) that may store all or part of instructions 1424. The term "machine-readable medium" shall also be taken to include any tangible medium that is capable of storing, encoding, or carrying a set of instructions (e.g. instructions 1424) for execution by a machine (e.g., system 100) and that cause the machine to perform any one or more of the methodologies or that is capable of storing, encoding, or carrying data structures utilized by or associated with such a set of instructions. The term "machine-readable medium" shall, accordingly, be taken to include but not be limited to solid-state memories, optical media, and magnetic media.

In accordance with some embodiments, shopping assistant 212 provides for updating ESL 214 in response to detecting a service request event 912 from asset 910 in accordance with method 1200. Accordingly, instructions 1424 include instructions for detecting, by a wireless device having an ESL stored in memory, a service request event corresponding to an asset and inserting a service request item into the ESL in response to the service request event.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method for monitoring maintenance tasks, the method comprising:
   detecting, by a mobile telephony device, a wirelessly transmitted message indicative of a maintenance task associated with an asset lacking means for wirelessly transmitting messages, wherein the wirelessly transmitted message is transmitted by an asset proxy, and wherein the asset proxy resides on a device selected from:
   the mobile telephony device; and
   the asset; and
   responsive to detecting the wirelessly transmitted message, modifying an electronic shopping list, stored in a computer readable storage medium of the mobile telephony device, to include a purchasable item associated with the maintenance task;
   wherein the asset includes an asset communication interface employing a communication protocol not supported by the mobile telephony device and wherein asset proxy includes a compliant protocol adapter connected to the asset communication interface.

2. The method of claim 1, further comprising querying the asset from time to time to verify asset operation.

3. The method of claim 2, wherein the wirelessly transmitted message includes an asset response to a service request query generated by the mobile telephony device.

4. The method of claim 1, wherein the asset communication interface includes an on board diagnostic (OBD) interface and the compliant protocol adapter employs a protocol compliant with a protocol selected from Bluetooth and Wifi to transmit the wirelessly transmitted message.

5. The method of claim 4, wherein the OBD interface comprises an OBD-II interface.

6. A mobile telephone device, comprising:
   a processor;
   a radio frequency module suitable for cellular communication;
   a wireless adapter suitable for communicating via a wireless data network; and
   a computer readable storage medium, accessible to the processor, including program instructions, executable by the processor, for monitoring maintenance tasks, wherein the program instructions, when executed by the processor, perform operations comprising:
   detecting a wirelessly transmitted message indicative of a maintenance task associated with an asset lacking means for wirelessly transmitting messages, wherein the wirelessly transmitted message is transmitted by an asset proxy residing on the asset; and
   responsive to detecting the wirelessly transmitted message, modifying an electronic shopping list stored in the computer readable storage medium to include a purchasable item associated with the maintenance task;
   wherein the asset includes a limited protocol interface that is non-compliant with protocols supported by the mobile telephone device and wherein the asset proxy includes a compliant protocol adapter connected to the limited protocol interface.

7. The mobile telephone device of claim 6, wherein the operations include:
   querying the asset to verify asset operation.

8. The mobile telephone device of claim 6, wherein the wirelessly transmitted message includes a response to a service request query generated by the mobile telephony device.

9. The mobile telephone device of claim 6, wherein the limited protocol interface includes an on board diagnostic interface.

10. The mobile telephone device of claim 9, wherein the wirelessly transmitted message is received from an adapter selected from a Bluetooth adapter and a Wifi adapter.

11. A non-transitory computer readable medium including stored processor-executable program instructions that, when executed by a processor, perform operations for monitoring maintenance tasks, the operations comprising:
   detecting, by a mobile telephony device, a wirelessly transmitted message indicative of a maintenance task associated with an asset lacking means for wirelessly transmitting messages, wherein the wirelessly transmitted message is transmitted by an asset proxy, and wherein the asset proxy resides on a device selected from:
   the mobile telephony device; and
   the asset; and
   responsive to detecting the wirelessly transmitted message, modifying an electronic shopping list, stored in a computer readable storage medium of the mobile telephony device, to include a purchasable item associated with the maintenance task;
   wherein the asset includes an asset communication interface employing a communication protocol not supported by the mobile telephony device and wherein asset proxy includes a compliant protocol adapter connected to the asset communication interface.

12. The computer readable medium of claim 11, wherein the operations include:
   querying the asset from time to time to verify asset operation.

13. The non-transitory computer readable medium of claim 12, wherein the wirelessly transmitted message includes an asset response to a service request query generated by the mobile telephony device.

14. The non-transitory computer readable medium of claim 11, wherein the asset communication interface includes an on board diagnostic (OBD) interface and the compliant protocol adapter employs a protocol compliant with a protocol selected from Bluetooth and WiFi to transmit the wirelessly transmitted message.

15. The non-transitory computer readable medium of claim 14, wherein the OBD interface comprises an OBD-II interface.

* * * * *